US011790408B2

(12) United States Patent
Blanc et al.

(10) Patent No.: US 11,790,408 B2
(45) Date of Patent: Oct. 17, 2023

(54) AUTOMATED VIDEO ADVERTISEMENT CREATION (71) Applicant: Vungle, Inc., San Francisco, CA (US)

(72) Inventors: Mariano Blanc, Sevenoaks (GB); Brett King, Bexley (GB)

(73) Assignee: Vungle, Inc., Palo Alto, CA (US)

(*) Notice: Subject to any disclaimer, the term of this patent is extended or adjusted under 35 U.S.C. 154(b) by 0 days.

(21) Appl. No.: 16/290,316

(22) Filed: Mar. 1, 2019

(65) Prior Publication Data

US 2020/0279303 A1 Sep. 3, 2020

(51) Int. Cl.
G06Q 30/02 (2023.01)
G06Q 30/0241 (2023.01)
H04N 21/44 (2011.01)
H04N 21/81 (2011.01)
G06F 9/50 (2006.01)

(52) U.S. Cl.
CPC ....... *G06Q 30/0276* (2013.01); *G06F 9/5011* (2013.01); *H04N 21/44016* (2013.01); *H04N 21/812* (2013.01)

(58) Field of Classification Search
None
See application file for complete search history.

(56) References Cited

U.S. PATENT DOCUMENTS

| 8,955,027 | B1* | 2/2015 | Dong | H04N 21/2335 725/116 |
| 9,860,569 | B1* | 1/2018 | Wilms | G11B 27/10 |
| 2008/0184287 | A1* | 7/2008 | Lipscomb | G06Q 30/02 725/32 |
| 2010/0023863 | A1* | 1/2010 | Cohen-Martin | G06Q 30/02 715/723 |
| 2011/0008017 | A1* | 1/2011 | Gausereide | G11B 27/036 386/280 |
| 2012/0004982 | A1* | 1/2012 | Cohee | G06Q 30/02 705/14.42 |
| 2012/0072286 | A1* | 3/2012 | Kilar | G06Q 30/02 705/14.55 |
| 2015/0378787 | A1* | 12/2015 | Cameron | G06T 1/20 718/104 |
| 2017/0034011 | A1* | 2/2017 | Butler | H04L 41/30 |
| 2017/0078687 | A1* | 3/2017 | Coward | H04N 19/395 |
| 2017/0214927 | A1* | 7/2017 | Zenoni | H04N 19/156 |

(Continued)

*Primary Examiner* — Mathew R. Syrowik
(74) *Attorney, Agent, or Firm* — Athorus, PLLC (57) ABSTRACT Described are systems and methods for automating the creation of advertisements, such as video advertisements. For example, an advertiser may utilize a self-service user interface to provide digital assets to an advertisement creation system that may utilize those digital assets to generate an advertisement for the advertiser, without further input from the advertiser. In one example, an advertiser may provide a video file, select a template for the advertisement, select a genre, provide one or more call to action text inputs, select a background color for call to action displays, and/or select an outro color theme for an outro or end card of the advertisement. The advertisement creation system may then utilize that information and, without further input from the advertiser, generate one or more jobs for execution by computing resources, such as remote computing resources to generate an advertisement based on the provided content.

18 Claims, 7 Drawing Sheets

(56) References Cited

U.S. PATENT DOCUMENTS

2018/0131979 A1* 5/2018 Bayoumi ................ H04L 67/32
2018/0192108 A1* 7/2018 Lyons ................... G11B 27/031
2018/0315098 A1* 11/2018 Wang ................. G06Q 30/0276

* cited by examiner

AUTOMATED VIDEO ADVERTISEMENT CREATION

BACKGROUND

With the continued increase in mobile device usage and the availability to digital content, advertising is shifting from generic print advertising to user specific and targeted digital advertising. However, this shift has resulted in advertisers having more difficulty developing targeted advertisements for the wide variety of consumers and their preferences. Likewise, advertisement creation for advertisements that are to be presented to consumers, for example, from within another application executing on a mobile device, remains a manual and inconsistent process.

DETAILED DESCRIPTION

Implementations described herein provide a system and method for automating the creation of advertisements, such as video advertisements, so that advertisers can dynamically generate a variety of different advertisements. For example, an advertiser may utilize a self-service user interface to provide content items to an advertisement creation system that may utilize those content items to generate an advertisement for the advertiser. In one example, an advertiser may provide a video file, select a template for the advertisement, select a genre, provide one or more call to action text inputs, select a background color for call to action displays, and/or select an outro color theme for an outro or end card of the advertisement. The advertisement creation system may then utilize that information and, without further input from the advertiser, generate one or more jobs for execution by computing resources, such as remote computing resources to generate an advertisement based on the provided content.

The advertisement creation system may assign one or more of the jobs to computing resource(s), provide content items to the computing resource as needed, monitor the progress of the job(s), and ultimately receive job outputs from the computing resource(s) as the job(s) complete. Once all jobs have completed, the advertisement creation system compiles the job outputs and produces an advertisement according to the inputs. The advertisement may then be provided to the advertiser for approval and use.

As discussed further below, the content items may be any form of content items that may be processed by one or more computing resources and/or utilized by the computing resources in generating the job outputs and ultimate advertisement. For example, content items may include, but are not limited to of video, sound, images, text, background colors, outro color, title, json files, compositor templates, compositor scripts, etc. Likewise, the jobs and/or capabilities may be any of a variety of types and the advertisement creation system may be agnostic to those types and capable of integrating with and providing content items to any of a variety of jobs and/or computing resources. For example, the jobs or computing resources with which the advertisement creation system may integrated with include, but are not limited to compositor scripts and/or compositor templates provided by/for systems such as ADOBE AFTER EFFECTS, LIGHTWORKS, AUTODESK MAYA, etc.

Independent of the inputs or the input types, the disclosed implementations may utilize computing resources, independent of further inputs from the advertiser, to autonomously generate advertisements on behalf of and for use by the advertiser.

Figure 1A:
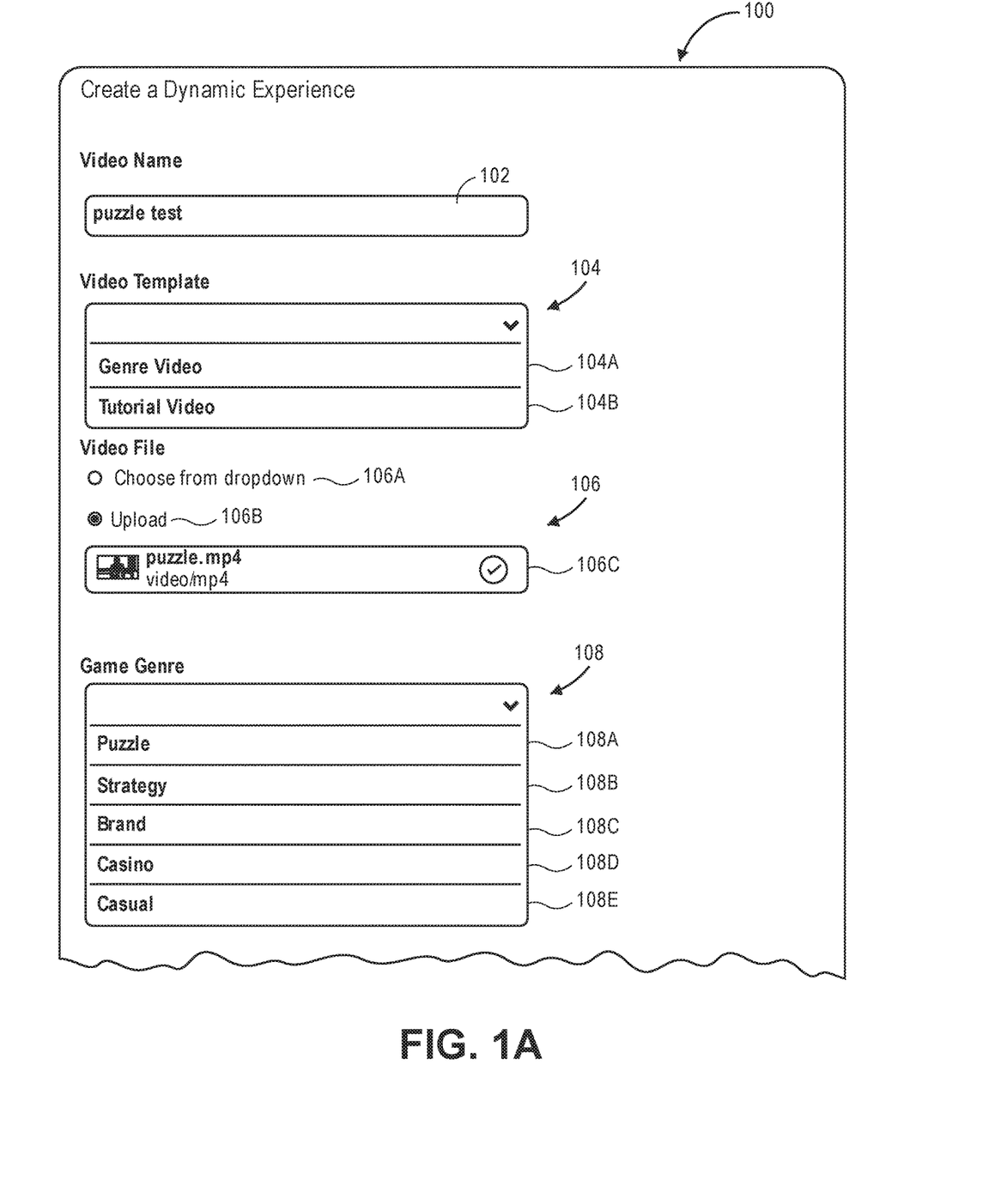
FIGS. 1A through 1B are illustrations of a user interface for providing assets to an advertisement creation system for automated advertisement creation, in accordance with described implementations.
Figure 1B:
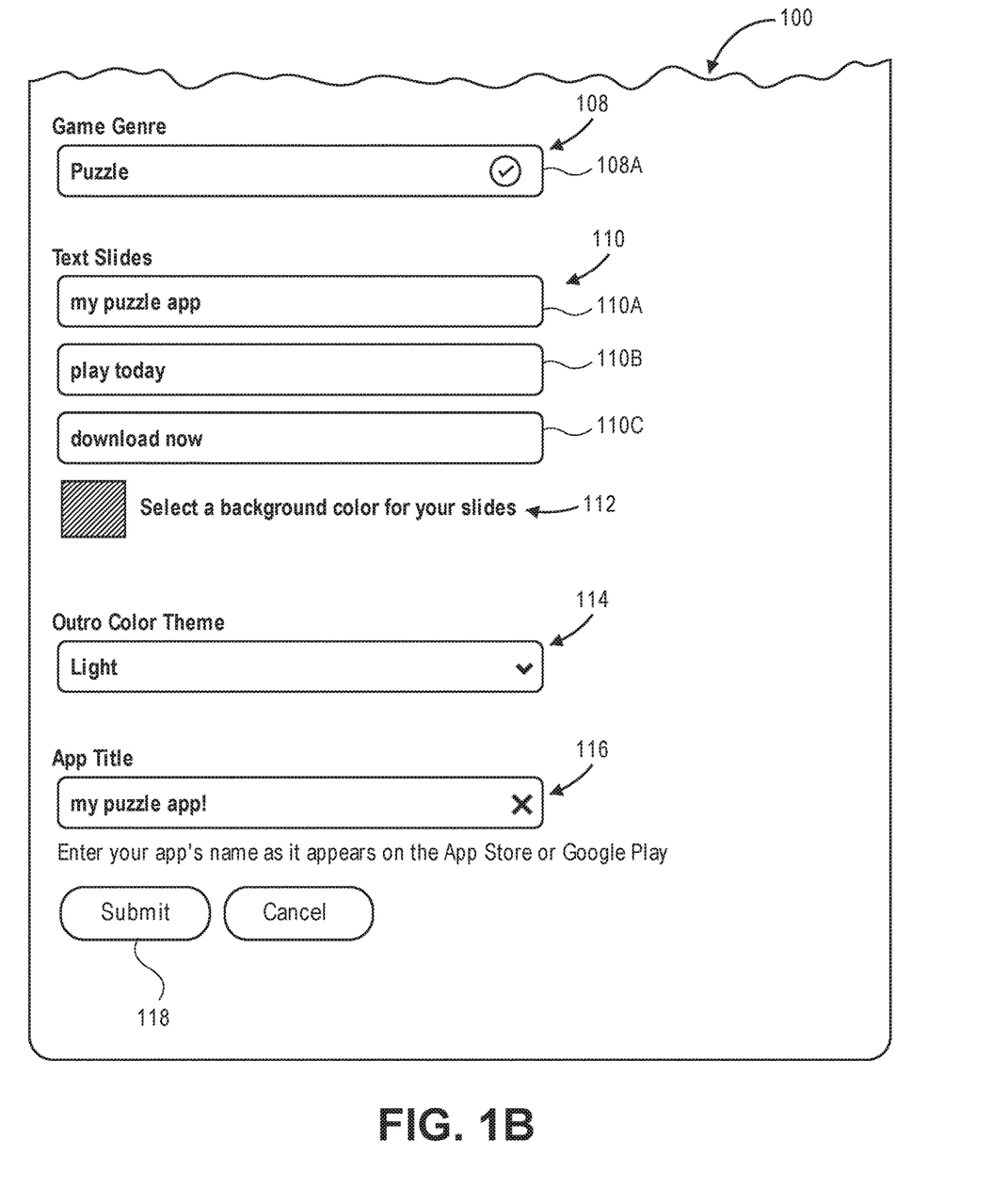

FIGS. 1A through 1B are illustrations of a user interface 100 for providing content items to an advertisement creation system for automated advertisement creation, in accordance with described implementations. The example illustrated with respect to FIGS. 1A through 1B relate to creation of a video advertisement. In other implementations, other forms of advertisements may be generated with the described implementations.

Referring first to FIG. 1A, an advertiser may provide one or more inputs to the user interface, such as a video name 102, in this example "puzzle test," and select a video template 104 for the video advertisement. In one implementation, the video template 104 may be selected from a list of available video templates such as "Genre Video" 104A, "Tutorial Video" 104B, programmatic advertising units, etc.

The advertiser may also select a genre 108, such as "Puzzle" 108A, "Strategy" 108B, "Brand" 108C, "Casino" 108D, "Casual" 108E, etc. In some implementations, the list of genre 108 options may vary depending upon the selected video template 104. In addition, as discussed below, the selected genre for a video template may specify or alter the options of the advertising template used to dynamically generate an advertisement, in accordance with described implementations.

Still further, the advertiser may upload a video file 106, such as "puzzle.mp4" 106C, through selection of the upload control 106B. Alternatively, if the advertiser has already provided video files, the advertiser may select the "Choose from dropdown" control 106A and select one or more previously provided video files. The uploaded or selected video file, such as "puzzle.mp4 106C, will be used by the disclosed implementations in the creation of the video advertisement. In other implementations, other types of digital content may also be updated, selected, or otherwise provided. For example, in addition or as an alternative to uploading a video file, the advertiser may provide an image, audio file, and/or other forms of digital assets.

Continuing to FIG. 1B, an advertiser may also provide, via the user interface 100 one or more call to action text inputs, or text Slides 110, such "my puzzle app" 110A, "play today" 110B, or "download now" 110C. While the illustrated example includes three text slides 110 or call to action text inputs, in other implementations an advertiser may provide fewer or additional text slides 110. In some implementations, the number of text inputs may be determined based on the video template 104 and/or genre 108 selected by the user. Likewise, in some implementations, a user may select to increase or decrease the number of text inputs or text slides 110.

Still further, an advertiser utilizing the user interface may select a background color 112 to be used by the described implementations when creating call to action displays that are included in a video advertisement. Any of a variety of colors may be selected. In some implementations, an advertiser may be provided a color palette or swatch from which to select a background color 112. In other implementations, an advertiser may provide a defined color (e.g., Pantone color), or input the Red, Green, Blue (RGB) values between 1 and 255 for a desired background color 112.

An advertiser may also select an outro color theme 114, such as Light, Dark, Bright, etc. Like the background color, an advertiser may selected a particular color for the outro color and/or provide a selected color theme, such as "Light."

An advertiser may also provide an application title 116 or name of the application advertised by the app that is to be created by the disclosed implementations. In this example, the advertiser has identified the name of the application as "my puzzle app!" In some implementations, if the advertiser inputs the name of the application as it is stored in a corresponding App Store, such as APPLE'S Application store, or GOOGLE'S application store, the disclosed implementations may automatically link the produced video advertisement to the corresponding application so that a viewer of the advertisement may select the advertisement and be automatically traversed to the download page within the application store to download the application.

Finally, an advertiser may select the "Submit" control 118 to submit the provided content items as part of a request to the disclosed implementations, to generate a video advertisement for the advertiser based on the provided content items.

Providing content items via a user interface, such as that illustrated in FIGS. 1A-1B allows the disclosed implementations to coordinate with one or more computing resources, such as remote computing resources to generate, without any further input from the advertiser, and produce an advertisement, such as a video advertisement, that utilizes the provided content. Accordingly, the disclosed implementations provide a technical improvement over existing systems by automating and standardizing the preparation and generation of video advertisements that are presented on devices, such as mobile devices. Likewise, as discussed further below, by automating the generation, the disclosed implementations may estimate or learn the approximate time required to complete jobs by various computing resources, monitor the load on those computing resources, and distribute or load balance jobs across the computing resources to reduce or minimize the processing time required to generate a video advertisement.

Figure 2:
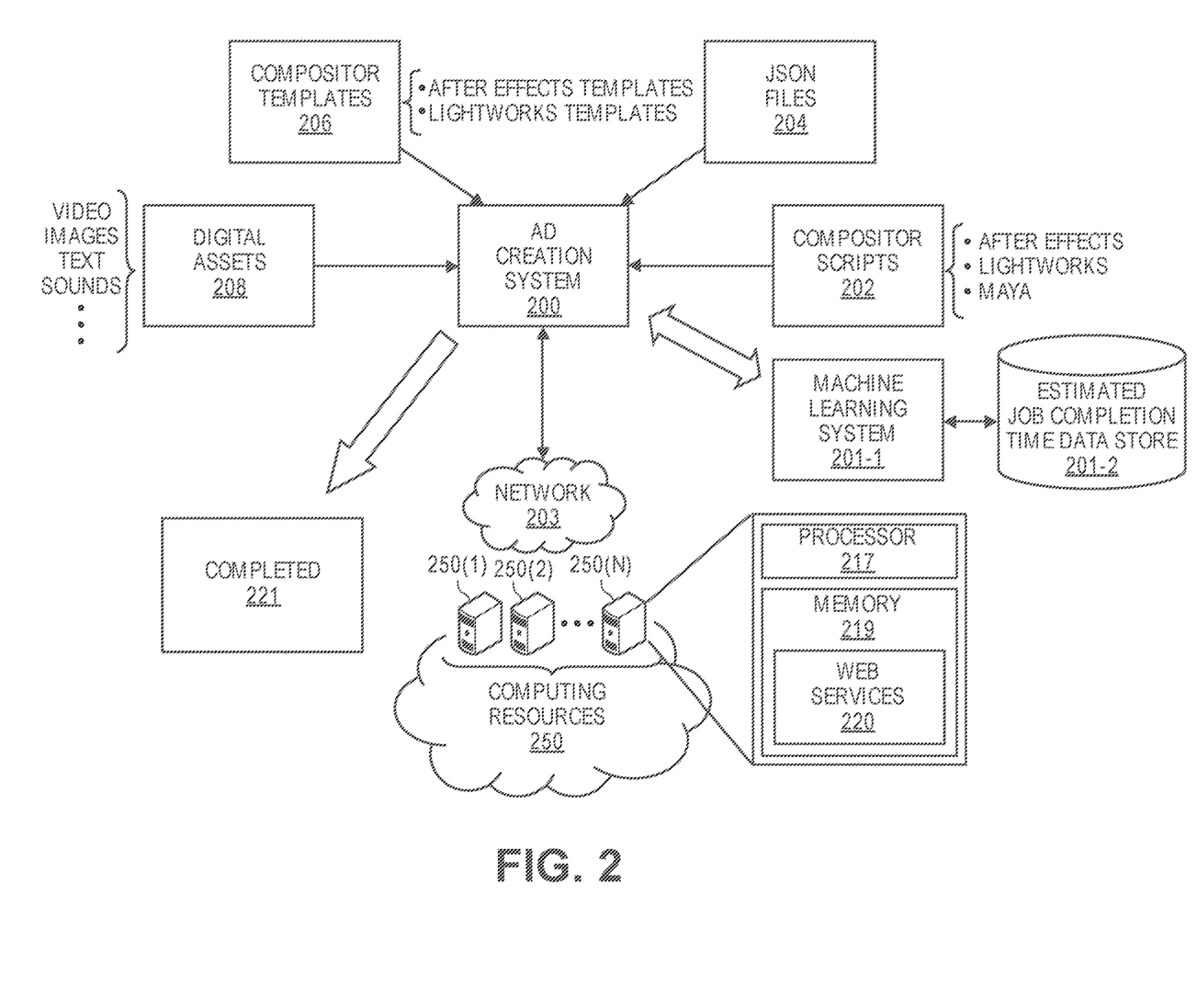
FIG. 2 is a block diagram illustrating an advertisement creation system, in accordance with described implementations.

FIG. 2 is a block diagram illustrating an advertisement creation environment, in accordance with described implementations. The example process includes an advertisement creation system 200 that is operable to receive as inputs from an advertiser, for example via the user interface discussed above with respect to FIGS. 1A through 1B. As discussed, the inputs may include, but are not limited to, digital assets 208, compositor templates 206, json files 204, compositor scripts 202, etc. Compositor scripts 202 and/or compositor templates 206 may be from any of a variety of sources such as AFTER EFFECTS, LIGHTWORKS, MAYA, etc. Likewise, digital assets 208, also referred to herein as content items may include, but are not limited to, video, images, text, sounds, haptics, etc.

Based on the received inputs and one or more templates, the ad creation system 200 may determine the jobs to be completed in generation of an advertisement based on the inputs. For example, a job may include segmentation of a provided digital asset, such as a video file, into a plurality of segments. Another job may include generation of one or more call to action displays that are generated based on the template, the selected background color, and the text inputs, provided as discussed above with respect to FIGS. 1A through 1B. Another job may be interleaving the generated call to action displays between the segments of the digital assets and a final job may be compiling the segments and the interleaved call to action displays into an advertisement.

Likewise, the ad creation system 200 may include or interface with a machine learning system 201-1 to determine estimated job completion times. For example, the machine learning system 201-1, may maintain in a data store 201-2 actual job completion times that it receives from the ad creation system 200 and/or directly from computing resources, such as the remote computing resources 250 for various different jobs and/or computing resource capabilities. Based on the actual job completion times, the machine learning system 201-1 may estimate job completion times of other jobs when performed by those resources.

Likewise, the machine learning system and/or the ad creation system may also determine an estimated queue time based on a current queue of jobs for each of one or more computing resources and estimate a total time for each potential computing resource to complete a job, based on the estimated job completion time and the estimated queue time. Utilizing the estimated job completion times and estimated queue times, jobs for an advertisement creation may be distributed to different computing resources in an efficient manner to balance a compute load across the available computing resources.

The ad creation system 200 may also include or communicate with computing resource(s) 250. The computing resource(s) 250 may be local to the ad creating system 200, remote from the ad creation system 200, or any combination thereof. Likewise, the computing resource(s) 250 may be configured to communicate over a network 203 with input components of the ad creation system 200 and/or the machine learning system 201-1.

As illustrated, the computing resource(s) 250 may be remote and implemented as one or more servers 250(1), 250(2), . . . , 250(N) and may, in some instances, form a portion of a network-accessible computing platform implemented as a computing infrastructure of processors, storage, software, data access, and so forth that is maintained and accessible by components/devices of the ad server system 200 and/or the machine learning system 201-1 via a network 203, such as an intranet (e.g., local area network), the Internet, etc. The computing resources 250 do not require end-user knowledge of the physical location and configuration of the system that delivers the services. Common expressions associated for these remote computing resource(s) 250 include "on-demand computing," "software as a service (SaaS)," "platform computing," "network-accessible platform," "cloud services," "data centers," and so forth.

Each of the servers 250(1)-(N) include one or more processors 217 and memory 219, which may store or otherwise have access to web services 220, which may include or provide image processing, call to action display creation, json file processing, compositor script processing, compositor template processing, etc.

The network 203 may utilize wired technologies (e.g., wires, USB, fiber optic cable, etc.), wireless technologies (e.g., radio frequency, infrared, NFC, cellular, satellite, Bluetooth, etc.), or other connection technologies. The network 203 is representative of any type of communication network, including data and/or voice network, and may be implemented using wired infrastructure (e.g., cable, CAT6, fiber optic cable, etc.), a wireless infrastructure (e.g., RF, cellular, microwave, satellite, Bluetooth, etc.), and/or other connection technologies.

As jobs are completed by the computing resources 250, the job outputs are provided via the network 203 back to the ad creation system 200. Likewise, actual job completion times may be provided back to the ad creation system 200 and/or to the machine learning system 201-1 and used to update the estimated job completion time data store 201-2 to further refine and improve the estimated job completion times.

Finally, the ad creation system 200 compiles the different job outputs and produces a completed advertisement 221 that is provided for use by the advertiser. In other implementations, compiling of completed jobs into the advertisement may itself be a job that is assigned to a computing resource. As discussed further below, the compiled advertisement includes and/or is based on the content items provided by the advertiser and/or the templates selected by the advertiser, as discussed above with respect to FIG. 1A through 1B.

Figure 3:
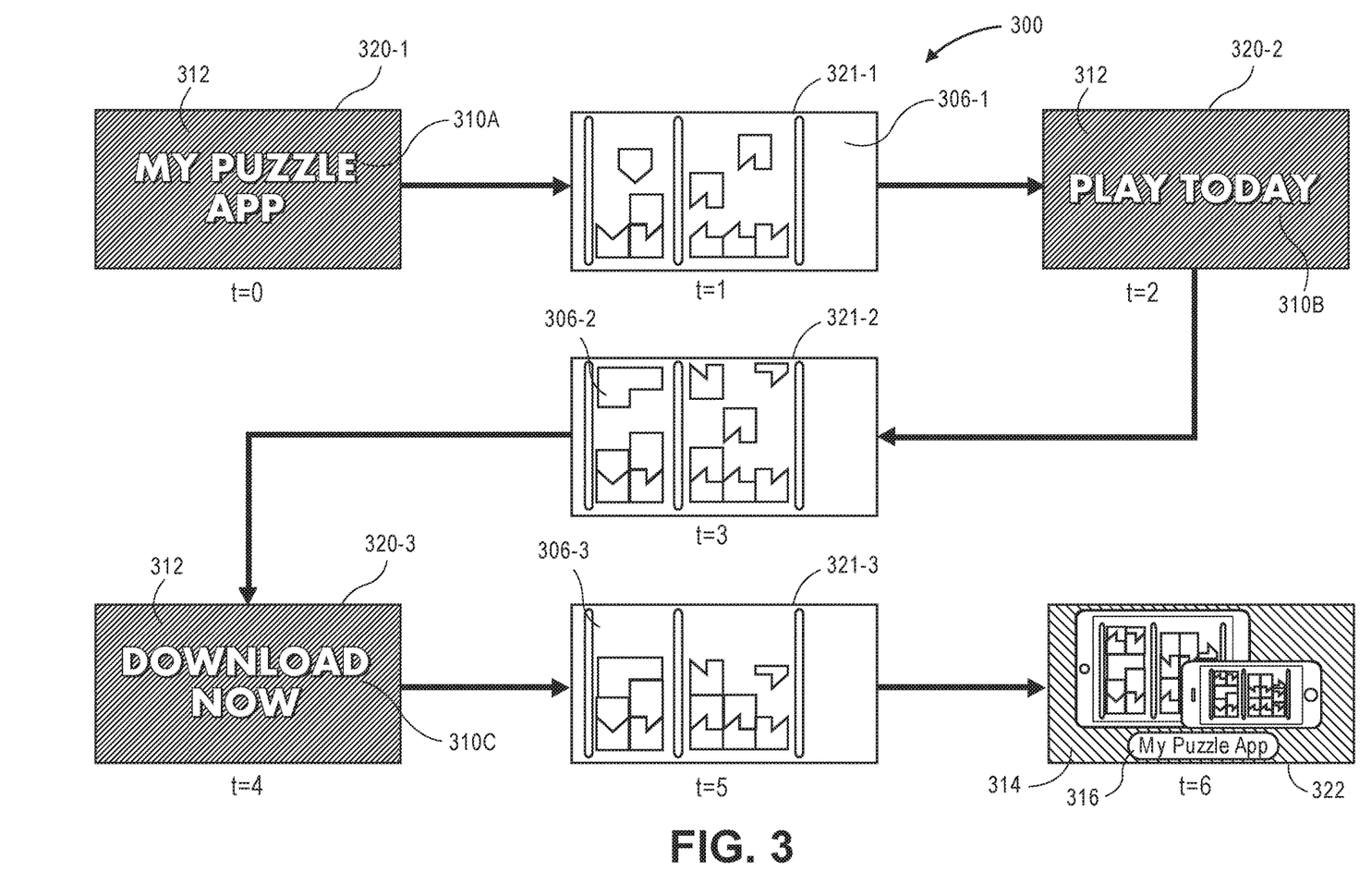
FIG. 3 illustrates a time progression of a video advertisement created by the advertisement creation system, in accordance with described implementations.

FIG. 3 illustrates a time progression 300 of an advertisement, in this example a video advertisement, created by the advertisement creation system, in accordance with described implementations. The video advertisement illustrated in FIG. 3 is produced from the inputs provided by the advertiser as described with respect to FIG. 1A through 1B. As discussed, the video advertisement is created based on those inputs without any further input or requirements from the advertiser. As illustrated, the first call to action display 320-1 has a background color 312 corresponding to the selected background color 112 (FIG. 1B) and a call to action 310A produced from the first text input 110A (FIG. 1B). As illustrated, based on the selected template 104 (FIG. 1A), selected game strategy 108 (FIG. 1A), and/or information about a target audience or user, the font size, shape and/or position of the call to action 310A may be selected by the ad creation system in creating the call to action display 320-1.

In this example, the first call to action display 320-1 is the initial portion of the video advertisement and presented at an initial time (t=0). In other examples, a first segment of the video file may be presented before the first call to action display. In addition, the first call to action is displayed for a defined period of time (e.g., two seconds) and then a first segment 321-1 of the provided/selected video file 106C (FIG. 1A) is presented as part of the advertisement. The first segment 321-1 may illustrate a first action 306-1 or portion of the application or other content represented in the video that corresponds to the advertisement. As with the first call to action, the first segment 320-1 is followed by a second call to action display 320-2.

The second call to action display 320-2, like the first call to action display 320-1, in this example, has the same background color 312 selected by the advertiser as discussed above with respect to FIG. 1A and includes a call to action 310B provided as the second text slide 110B in FIG. 1B. Like the first call to action display, the second call to action display 320-2 is presented for a defined period of time or duration. Following the defined period of time, a second segment 321-2 is presented that illustrates a second portion 306-2 of the application or other content being advertised. Like the first segment, the second segment is extracted from the previously provided or selected video file 106C (FIG. 1A) and the second segment is presented for a defined period of time as part of the advertisement.

Following the second segment 321-2, a third call to action display 320-3 is presented that includes the selected background color 312 and the call to action 310C provided as the third text slide 110C (FIG. 1B). As with the other call to action displays 320, the background color, font, font size, presentation duration, etc., may be determined by the advertisement creation system.

Following presentation of the third call to action display 320-3, a third video segment 321-3 is presented that includes a third portion 306-3 of the application or other item being advertised. In one implementation, the three video segments 321-1, 321-2, 321-3 may be sequential in time of an application illustrating a players progression through the application. In other examples, the video segments 321 may be short segments of an advertised movie, song, video, etc.

Finally, in this example, following the third segment 321-3, an outro display 322 or end card is presented with information about the advertised content and, in this example, a control 316 that enables a viewer of the advertisement to obtain or access the advertised content. In addition, the theme 314 of the outro display 322 corresponds to the outro color theme 114 selected by the advertiser (FIG. 1B)

While the illustrated examples utilizes the same background color, font, font spacing, and font size, for each call to action display 320, in other implementations, one or more of the background color, font, font spacing, font size, and/or duration of presentation, may vary for the one or more of the call to action displays. Likewise, while the illustrated example includes three call to action displays 320, in other implementations the video advertisement may be created to include fewer or additional call to action displays. For example, if the advertiser provides six text slides, there may be six call to action displays. As part of the advertisement creation system preparing the video advertisement, the provided or selected video file 106 may be appropriately segmented, for example based on time, such that each call to action display is presented as part of the complete video advertisement. Still further, while the illustrated example separates each call to action with a video segment, in some implementations, two or more call to action displays may be presented adjacent in time.

In some implementation the speed at which the advertisement is presented, the duration of the advertisement, the number and/or positioning of the call to action displays, the duration of which each call to action display is presented, etc., may be generated as part of the disclosed implementations and may vary based on the selected template and/or genre, as discussed above.

Figure 4:
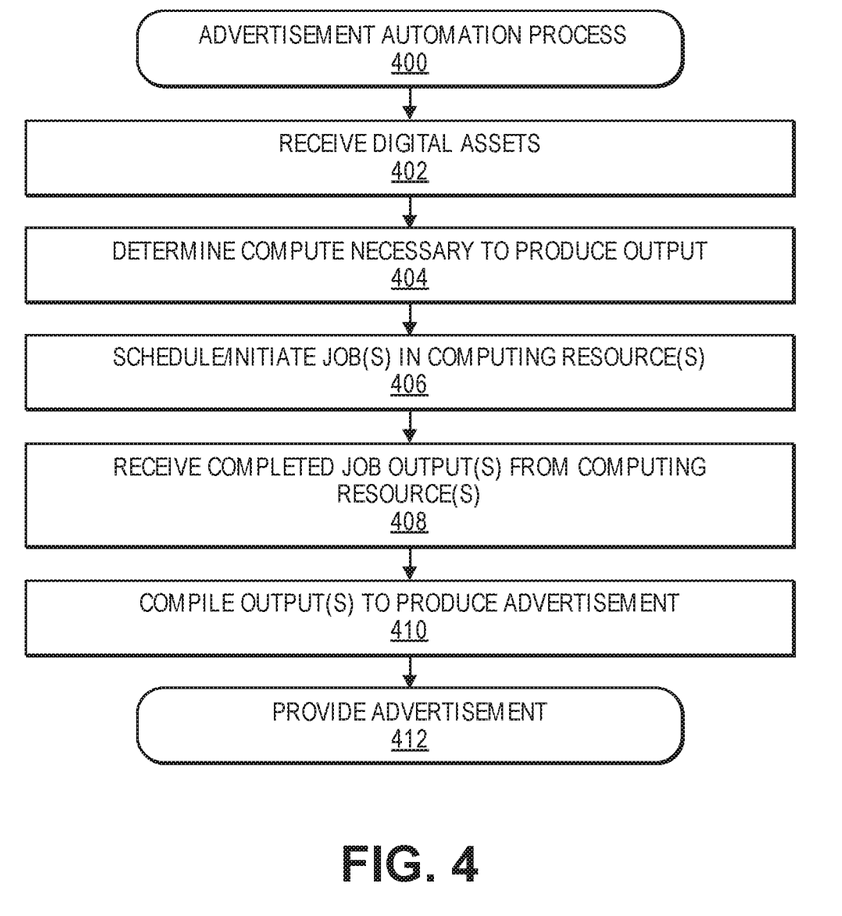
FIG. 4 is an example advertisement automation process, in accordance with described implementations.

FIG. 4 is an example advertisement automation process 400, in accordance with described implementations. The example process begins with the receipt of one or more digital assets or content items from an advertiser that are to be used in the creation of an advertisement, as in 402. As discussed above, an advertiser may provide digital assets via, for example, a user interface, such as a web browser. In some implementations, the example process 400 may also receive or determine or one more templates to use in creating the advertisement. For example, the advertiser may select a template for use in creating the advertisement. Likewise, the advertiser may select a genre and/or category and a template corresponding to the genre or category may be selected for creating the video advertisement. In other implementations, the template may be automatically selected based on the advertisers selection of the genre and/or category for the advertisement.

Based on the received digital assets, genre, category, and/or template, computing resources necessary to produce outputs for use in creating the advertisement are determined, as in 404. As noted above, any of a variety of digital assets may be received and processed by the disclosed implementations. As such, the type of digital assets may be determined and computing resources, such as remote computing resources, capable of processing those types of digital assets to produce desired job assets may be determined.

Based on the determined computing resources needed, one or more jobs are scheduled and initiated with those computing resources, as in 406. For example, if there are three types of different digital assets received, each of which require different computing resources to process, the example process 400 may determine that three different jobs are to be performed and assign those different jobs to each of three different computing resources. As discussed herein, job assignment may be load balanced across multiple capable computing resources to distribute the work and reduce the time required to process and prepare advertisements.

As jobs are completed, the job outputs from each computing resource are received by the example process 400, as in 408. In some implementations, as one job output is received from one computing resource, the job output may be provided as an input to another job to be performed by another computing resource. In such an example, the example process 400 may manage the scheduling and initiation of jobs by different computing resource so that a computing resource is not waiting for an output from another computing resource.

Upon receipt of all job outputs for jobs created for an advertisement, the outputs are compiled to create an advertisement, as in 410. In some implementations, the job outputs may be compiled or combined by the example process executing on the advertisement creation system discussed above. In other implementations, the job outputs may be compiled as part of a final job issued by the example process 400 to another computing resource.

Finally, the generated advertisement is provided to the advertiser and/or directly to consumers for viewing and selection, as in 412.

Figure 5:
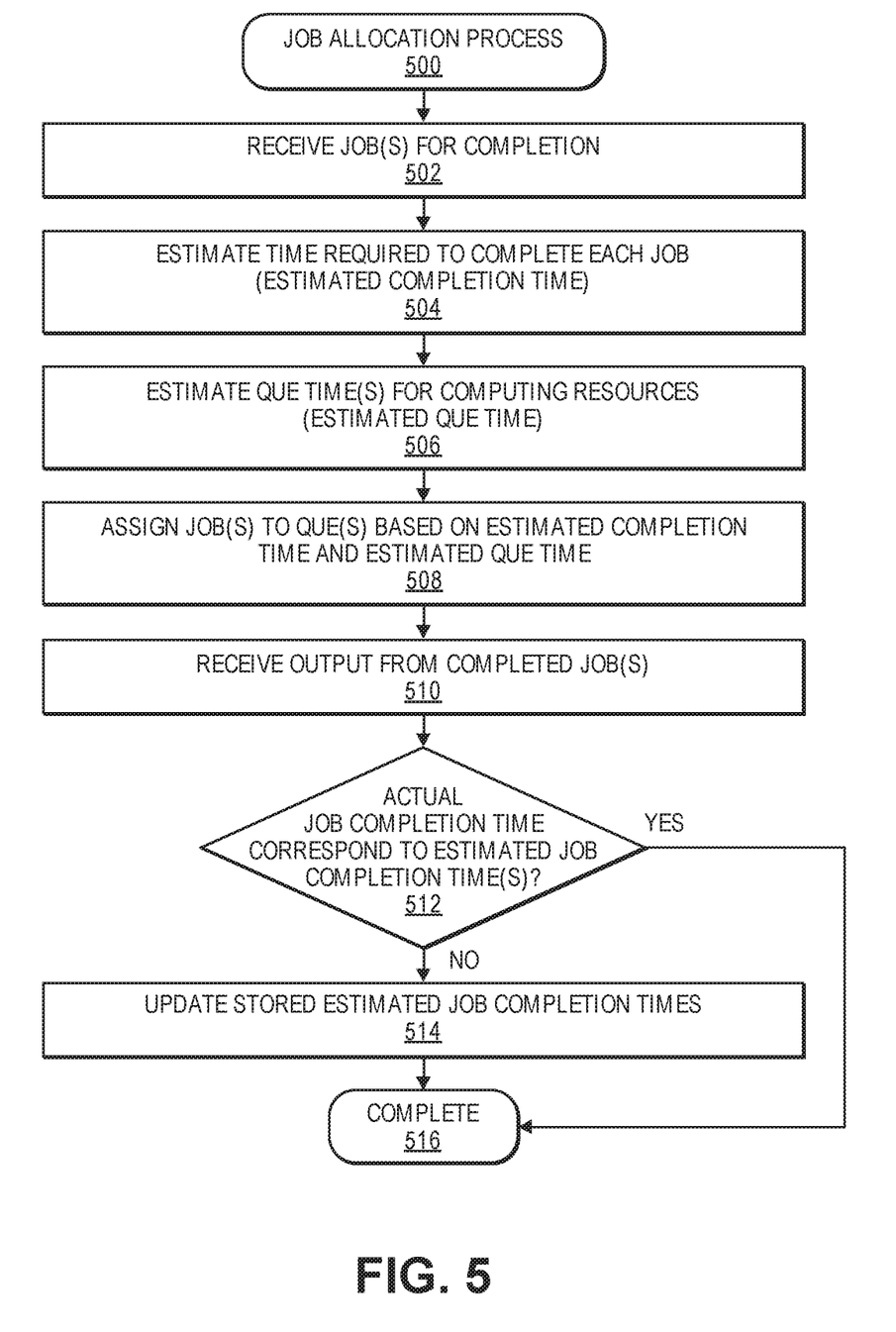
FIG. 5 is an example job allocation process, in accordance with described implementations.

FIG. 5 is an example job allocation process 500, in accordance with described implementations. The example job allocation process may be performed as part of or as a sub-process to the example process 400 discussed above. For example, the job allocation process 500 may be utilized with the scheduling of jobs to different computing resources.

The example process 500 begins upon receipt of one or more jobs for completion in the creation of an advertisement, as in 502. Upon receiving one or more jobs, the example process 500 estimates the time required to complete each received job, referred to herein as estimated completion time, as in 504. As discussed above, in some implementations, a machine learning system may receive actual job completion times for various jobs and utilize those actual completion times to estimate future job completion times.

In addition to determining the estimated completion time(s) for jobs that are required to produce an advertisement, the example process may also determine estimated queue times for one or more computing resources available and capable of completing one or more of the jobs, as in 506. Similar to determining estimated completion time for a job to be assigned, the example process 500 may utilize the machine learning system to estimate a queue time of a computing resource based on the jobs assigned to the queue and the estimated completion time for each of those jobs.

Based on the determined estimated completion times and the estimated queue times, each of the jobs may be assigned by the example process 500 to a computing resource for completion, as in 508. As discussed above, if one job is dependent upon or needs an output from another job, such job may not be assigned to a queue unless the job is not estimated to start until a time after the output of the job from which it depends will be available. For example, if the output from job1 is necessary as an input to job2, job2 may not be assigned to a queue until job1 completes and the output of job1 is available. Alternatively, if job1 is estimated to take five minutes to complete and the estimated queue time for a computing resource that is cable of processing job2 is eight minutes, job2 may be assigned to the queue at the same time as job1, with the expectation that the computing resource will not begin processing job2 until the output from job1 is available, due to the estimated queue time.

As jobs are completed, the output from the jobs are received, as in 510. As each job output is received, the actual job completion time may also be received and/or determined by the example process and a determination made as to whether the actual job completion time corresponds with the estimated job completion time, as in 512. The actual job completion time may be determined to corresponding to the estimated job completion time if the actual job completion time and the estimated job completion time are with a defined percentage of one another (e.g., 95%). If it is determined that the actual job completion time does not correspond with the estimated job completion time, the stored estimated job completion times may be updated with the actual job completion time, as in 514. In some implementation, the stored estimated job completion time may be replaced with the actual job completion time, or the stored estimated job completion time and the actual job completion time may be combined, such as averaged, to determine an updated estimated job completion time. In other examples, a machine learning system may receive the actual job completion time as additional training or tuning inputs and update the machine learning to generate updated estimated job completion times.

If it is determined that the actual job completion time does correspond with the estimated job completion time, or after updating the estimated job completion time, the example process 500 completes, as in 516.

Figure 6:
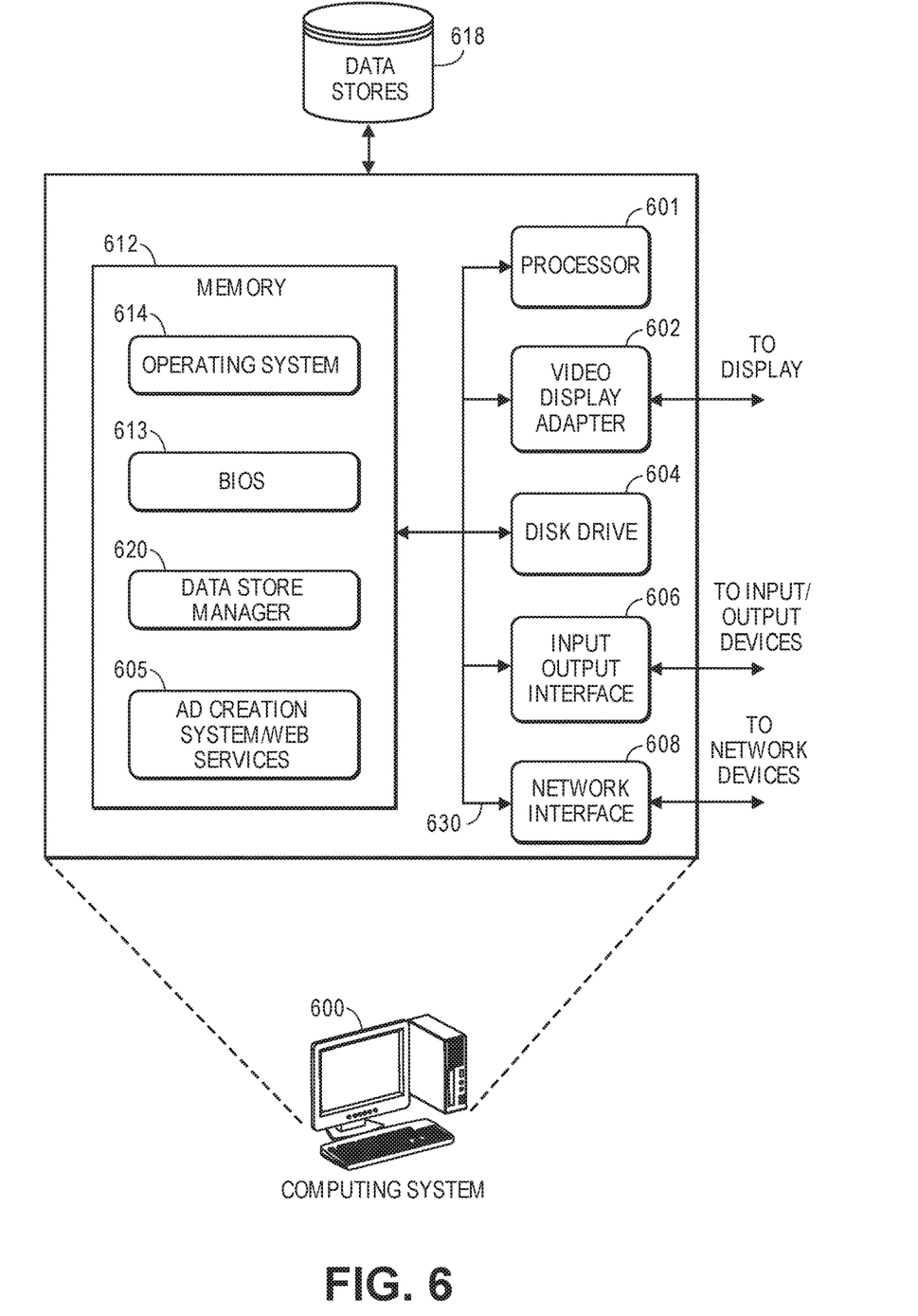
FIG. 6 is a pictorial diagram of an illustrative implementation of a server system that may be used for various implementations.

FIG. 6 is a pictorial diagram of an illustrative implementation of a server system 600, such as a remote computing resource, that may be used with one or more of the implementations described herein. The server system 600 may include a processor 601, such as one or more redundant processors, a video display adapter 602, a disk drive 604, an input/output interface 606, a network interface 608, and a memory 612. The processor 601, the video display adapter 602, the disk drive 604, the input/output interface 606, the network interface 608, and the memory 612 may be communicatively coupled to each other by a communication bus 630.

The video display adapter 602 provides display signals to a local display permitting an operator of the server system 600 to monitor and configure operation of the server system 600. The input/output interface 606 likewise communicates with external input/output devices, such as a mouse, keyboard, scanner, or other input and output devices that can be operated by an operator of the server system 600. The network interface 608 includes hardware, software, or any combination thereof, to communicate with other computing devices.

The memory 612 generally comprises random access memory (RAM), read-only memory (ROM), flash memory, and/or other volatile or permanent memory. The memory 612 is shown storing an operating system 614 for controlling the operation of the server system 600. A binary input/output system (BIOS) 613 for controlling the low-level operation of the server system 600 is also stored in the memory 612.

The memory 612 additionally stores program code and data for providing network services that allow external sources to exchange information and data files with the server system 600. The memory also stores a data store manager application 620 to facilitate data exchange and mapping between the data store 618, ad creation system/web services 605, user devices, external sources, etc.

The memory 612 may also include the ad creation system and/or one or more web services 605, as appropriate. The ad creation system/web services 605 may be executable by the processor 601 to implement one or more of the functions of the server system 600. In one implementation, the ad creation system/web services 605 may represent instructions embodied in one or more software programs stored in the memory 612. In another implementation, the server system 600 can represent hardware, software instructions, or a combination thereof. The ad creation system/web services 605 may perform some or all of the implementations discussed herein, alone or in combination with other devices.

As used herein, the term "data store" refers to any device or combination of devices capable of storing, accessing and retrieving data, which may include any combination and number of data servers, databases, data storage devices and data storage media, in any standard, distributed or clustered environment. The server system 600 can include any appropriate hardware and software for integrating with the data store 618 as needed to execute aspects of the described implementations. The server system 600 provides access control services in cooperation with the data store 618 and is able to generate content such as advertisements and/or job outputs.

The data store 618 can include several separate data tables, databases or other data storage mechanisms and media for storing data relating to a particular aspect. For example, the data store 618 illustrated includes content estimated job completion times, actual job completion times, video files, templates, etc. User profiles, machine learned user models, and other information may likewise be stored in the data store.

It should be understood that there can be many other aspects that may be stored in the data store 618, which can be stored in any of the above listed mechanisms as appropriate or in additional mechanisms of any of the data stores. The data store 618 may be operable, through logic associated therewith, to receive instructions from the server system 600 and obtain, update or otherwise process data in response thereto.

The server system 600, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction in FIG. 6 should be taken as being illustrative in nature and not limiting to the scope of the disclosure.

The concepts disclosed herein may be applied within a number of different devices and computer systems, including, for example, general-purpose computing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the art should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:
one or more processors; and
a memory storing program instructions that, when executed by the one or more processors, cause the one or more processors to at least:
receive, via an interaction with a user interface, from an advertiser:
a plurality of content items for creating a video advertisement, the plurality of content items including digital video files containing one or more video content items;
a text input to include in the video advertisement; and
a selection of a video template specifying one or more options for the video advertisement;
generate, without further input from the advertiser, a plurality of jobs including a first job, a second job, and a third job, wherein:
the first job of the plurality of jobs includes segmenting a first video content item of the one or more video content items into at least a first segment and a second segment;
the second job of the plurality of jobs includes generating a call to action display based at least in part on the video template, the text input, and at least one of the one or more video content items; and
the third job of the plurality of jobs includes interleaving the call to action display between the first segment and the second segment, wherein an execution of the third job is dependent on the first segment and the second segment from the first job and the call to action display from the second job;
without further input from the advertiser:
monitor job loads associated with a plurality of computing resources that are in communication with the one or more processors; and
in response to monitoring of the job loads:
determine a first computing resource of the plurality of computing resources capable of performing and completing the first job;
determine a second computing resource of the plurality of computing resources capable of performing and completing the second job;
determine, using a trained machine learning model, a first estimated job completion time and a first estimated queue time for the first job when executed by the first computing resource, wherein the trained machine learning model was trained using actual job completion times;
determine, using the trained machine learning model, a second estimated job completion time and a second estimated queue time for the second job when executed by the second computing resource;
assign, based at least in part on the first estimated job completion time, the first estimated queue time, the second estimated queue time, and the second estimated job completion time, the first job to the first computing resource;
assign, based at least in part on the first estimated job completion time, the first estimated queue time, the second estimated queue time, and the second estimated job completion time, the second job to the second computing resource;
determine a third computing resource of the plurality of computing resources capable of performing the third job in view of an associated queue time and the first estimated job completion time, the first estimated queue time, the second estimated queue time, and the second estimated job completion time; and
assign the third job to the third computing resource, such that the third job will not begin until after a completion of the first job and the second job,
wherein assigning the first job to the first computing resource, assigning the second job to the second computing resource, and assigning the third job to the third computing resource distributes the first job, the second job, and the third job among the plurality of computing resources to load balance processing of the first job, the second job, and the third job among the first computing resource, the second computing resource, and the third computing resource to process and prepare the video advertisement;
receive, from the third computing resource, a completed job output including the call to action display interleaved between the first segment and second segment; and
compile, without further input from the advertiser, the completed job output to produce the video advertisement;
compare the first estimated job completion time with a first actual job completion time;
compare the second estimated job completion time with a second actual job completion time;
provide at least one of the first actual job completion time or the second actual job completion time as a further training input to the trained machine learning model; and
update the trained machine learning model based on the further training input.

2. The computing system of claim 1, wherein the program instructions further cause the one or more processors to at least:
receive, from the advertiser, a selection of a genre; and
wherein a content item of the plurality of content items is segmented according to the video template and the genre.

3. The computing system of claim 1, wherein the plurality of content items include at least one of a video, a sound, an image, a text, a background color, an outro color, a title, a json file, a compositor template, or a compositor script.

4. The computing system of claim 3, wherein the video advertisement includes at least an intro display, the first segment of the video, the call to action display, the second segment of the video, and an outro display.

5. The computing system of claim 4, wherein the program instructions, when executed by the one or more processors, further cause the one or more processors to at least:
determine a third estimated queue time for a fourth computing resource;
determine that the first estimated queue time is less than the third estimated queue time; and
in response to determining that the first estimated queue time is less than the third estimated queue time, assign the first job to the first computing resource.

6. The computing system of claim 1, wherein the video advertisement includes a selectable link.

7. A computer-implemented method, comprising:
receiving, via an interaction with a user interface and from an advertiser, a video digital asset and a text input, wherein the video digital asset is contained in a digital video file;
generating, without further input from the advertiser, a plurality of jobs including a first job, a second job, and a third job to be performed by a plurality of computing resources to process the video digital asset and the text input, wherein:

the first job of the plurality of jobs includes segmenting the video digital asset into at least a first segment and a second segment;

the second job of the plurality of jobs includes generating a call to action display based at least in part on the text input; and the third job of the plurality of jobs includes interleaving the call to action display between the first segment and the second segment, wherein an execution of the third job is dependent on the first segment and the second segment from the first job and the call to action display from the second job;

without further input from the advertiser:

monitoring job loads associated with the plurality of computing resources; and in response to monitoring the job loads:

determining a first computing resource of the plurality of computing resources capable of performing and completing the first job;

determining a second computing resource of the plurality of computing resources capable of performing and completing the second job;

determining, using a trained machine learning model, a first estimated job completion time and a first estimated queue time for the first job when executed by the first computing resource, wherein the trained machine learning model was trained using actual job completion times;

determining, using the trained machine learning model, a second estimated job completion time and a second estimated queue time for the second job when executed by the second computing resource;

assigning, based at least in part on the first estimated job completion time, the first estimated queue time, the second estimated queue time, and the second estimated job completion time, the first job to the first computing resource;

assigning, based at least in part on the first estimated job completion time, the first estimated queue time, the second estimated queue time, and the second estimated job completion time, the second job to the second computing resource;

determining a third computing resource of the plurality of computing resources capable of performing the third job in view of an associated queue time and the first estimated job completion time, the first estimated queue time, the second estimated queue time, and the second estimated job completion time; and assigning the third job to the third computing resource, such that the third job will not begin until after a completion of the first job and the second job, wherein assigning the first job to the first computing resource, assigning the second job to the second computing resource, and assigning the third job to the third computing resource distributes the first job, the second job, and the third job among the plurality of computing resources to load balance processing of the first job, the second job, and the third job among the first computing resource, the second computing resource, and the third computing resource to process and prepare a video advertisement;

receiving, from the third computing resource, a completed job output including the call to action display interleaved between the first segment and second segment;

producing, based at least in part on the completed job output and without further input from the advertiser, the video advertisement;

providing the video advertisement to the advertiser;

comparing the first estimated job completion time with a first actual job completion time;

comparing the second estimated job completion time with a second actual job completion time;

providing at least one of the first actual job completion time or the second actual job completion time as a further training input to the trained machine learning model; and updating the trained machine learning model based on the further training input.

8. The computer-implemented method of claim 7, further comprising:

receiving, from the advertiser, a second text input; and wherein the video advertisement further includes the second text input interleaved between the second segment and a third segment of the video digital asset.

9. The computer-implemented method of claim 8, wherein producing the video advertisement further includes:

generating, based at least in part on the second text input, a second call to action display; and interleaving the second call to action display between the second segment and the third segment of the video digital asset.

10. The computer-implemented method of claim 9, further comprising:

receiving, from the advertiser, an indication of a background color; and wherein the call to action display and the second call to action display include the background color.

11. The computer-implemented method of claim 10, further comprising:

receiving, from the advertiser, an indication of an application title corresponding to an application advertised in the video advertisement; and wherein producing the video advertisement further comprises including an outro display that includes at least the application title.

12. The computer-implemented method of claim 7, further comprising:

determining a third estimated queue time for a fourth computing resource;

determining that the first estimated queue time is less than the third estimated queue time; and in response to determining that the first estimated queue time is less than the third estimated queue time, assigning the first job to the first computing resource.

13. The computer-implemented method of claim 7, further comprising:

determining the queue time for the third computing resource based at least in part on a third estimated job completion time for a fourth job and further based at least in part on the fourth job being assigned to a queue for completion by the third computing resource.

14. The computer-implemented method of claim 7, further comprising:

generating a fourth job to be performed by a fourth computing resource to process the completed job output to produce the video advertisement; and assigning the fourth job to the fourth computing resource.

15. A non-transitory computer-readable storage medium storing instructions that, when executed by at least one processor of a computing system, cause the computing system to at least:
- receive, via an interaction with a user interface, from an advertiser:
  - a video file;
  - a first text input;
  - a second text input; and
  - an indication of a background color;
- determine a template to be used to generate an advertisement that includes:
  - at least a portion of the video file, a first call to action, a second call to action and the background color;
- generate, without further input from the advertiser, a plurality of jobs to be performed by a plurality of computing resources to process the video file, the first text input, the second text input and the background color to produce the advertisement in which the first text input is interleaved between a first segment of the video file and a second segment of the video file in accordance with the template, wherein:
  - a first job of the plurality of jobs includes segmenting the video file into at least the first segment, the second segment, and a third segment;
  - a second job of the plurality of jobs includes generating a first call to action display based at least in part on the first text input and the background color;
  - a third job of the plurality of jobs includes generating a second call to action display based at least in part on the second text input and the background color; and
  - a fourth job of the plurality of jobs includes interleaving the first call to action display between the first segment and the second segment and interleaving the second call to action display between the second segment and the third segment, wherein an execution of the third job is dependent on the first segment, the second segment, and the third segment from the first job, the first call to action display from the second job, and the second call to action display from the third job;
- without further input from the advertiser:
  - monitor job loads associated with the plurality of computing resources; and
  - in response to monitoring of the job loads:
    - determine a first computing resource of the plurality of computing resources capable of performing the first job;
    - determine a second computing resource of the plurality of computing resources capable of performing the second job;
    - determine a third computing resource of the plurality of computing resources capable of performing the third job;
    - determine, using a trained machine learning model, a first estimated job completion time and a first estimated queue time for the first job when executed by the first computing resource, wherein the trained machine learning model was trained using actual job completion times;
    - determine, using the trained machine learning model, a second estimated job completion time and a second estimated queue time for the second job when executed by the second computing resource;
    - determine, using the trained machine learning model, a third estimated job completion time and a third estimated queue time for the third job when executed by the third computing resource;
    - assign, based at least in part on the first estimated job completion time, the second estimated job completion time, the first estimated queue time, the second estimated queue time, the third estimated queue time, and the third estimated job completion time, the first job to the first computing resource;
    - assign, based at least in part on the first estimated job completion time, the second estimated job completion time, the first estimated queue time, the second estimated queue time, the third estimated queue time, and the third estimated job completion time, the second job to the second computing resource;
    - assign, based at least in part on the first estimated job completion time, the second estimated job completion time, the first estimated queue time, the second estimated queue time, the third estimated queue time, and the third estimated job completion time, the third job to the third computing resource;
    - determine a computing resource of the plurality of computing resources capable of performing the fourth job in view of an associated queue time and the first estimated job completion time, the second estimated job completion time, the first estimated queue time, the second estimated queue time, the third estimated queue time, and the third estimated job completion time; and
    - assign the fourth job to a fourth computing resource, such that the fourth job will not begin until after a completion of the first job, the second job, and the third job,
    - wherein assigning the first job to the first computing resource, assigning the second job to the second computing resource, assigning the third job to the third computing resource, and assigning the fourth job to the fourth computing resource distributes the first job, the second job, the third job, and the fourth job among the plurality of computing resources to load balance processing of the first job, the second job, and the third job among the first computing resource, the second computing resource, and the third computing resource to process and prepare the advertisement;
- receive, from the fourth computing resource, the advertisement including the first call to action display interleaved between the first segment and the second segment and the second call to action display interleaved between the second segment and the third segment;
- provide the advertisement to the advertiser;
- compare the first estimated job completion time with a first actual job completion time;
- compare the second estimated job completion time with a second actual job completion time;
- compare the third estimated job completion time with a third actual job completion time;
- provide at least one of the first actual job completion time, the second actual job completion time, or the third actual job completion time as a further training input to the trained machine learning model; and
- update the trained machine learning model based on the further training input.

16. The non-transitory computer-readable storage medium of claim 15, wherein the instructions, when executed by the at least one processor, further cause the computing system to at least:

receive, from the advertiser, at least one of a sound, an image, an outro color, a title, a json file, a compositor template, or a compositor script; and     wherein generation of the advertisement further includes generating a fifth job to process the at least one of the sound, the image, the outro color, the title, the json file, the compositor template, or the compositor script to generate an outro display that is included at an end of the advertisement.

17. The non-transitory computer-readable storage medium of claim 15, wherein the instructions, when executed by the at least one processor, further cause the computing system to at least:

receive, from the advertiser, a selection of the template.

18. The non-transitory computer-readable storage medium of claim 15, wherein the instructions, when executed by the at least one processor, further cause the computing system to at least:

determine a genre for the advertisement; and wherein generation of the advertisement is further based at least in part on the genre.

\* \* \* \* \*